July 3, 1923.
A. B. SHAW
VALVE STEM FOR PNEUMATIC TIRES
Filed July 18, 1922
1,460,804
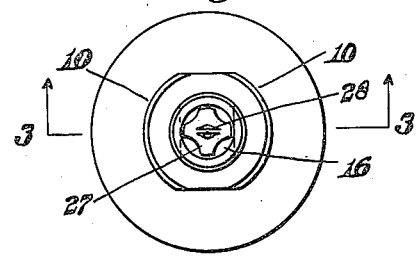
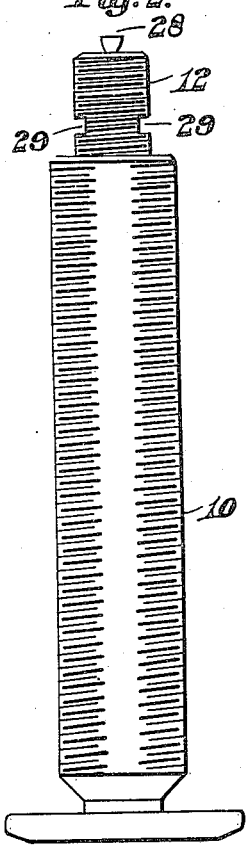
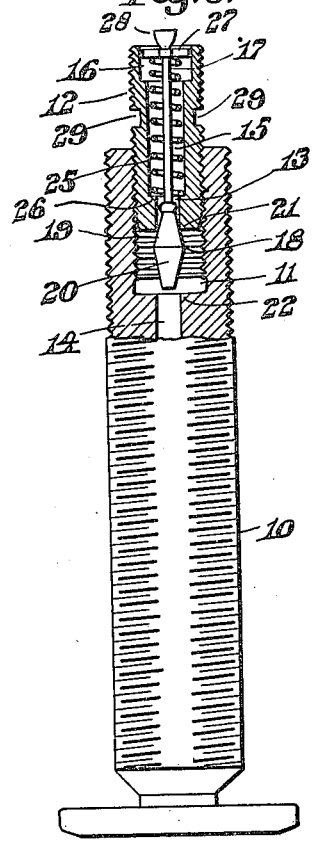
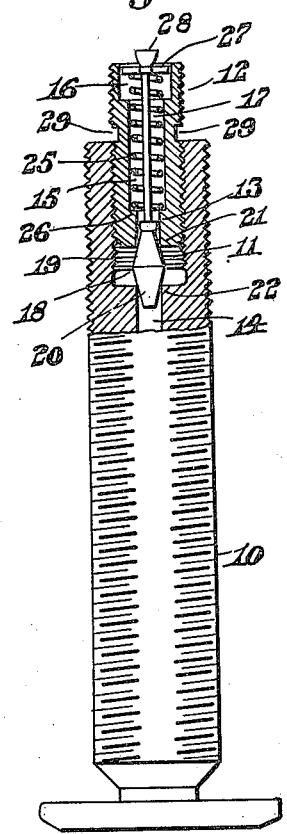
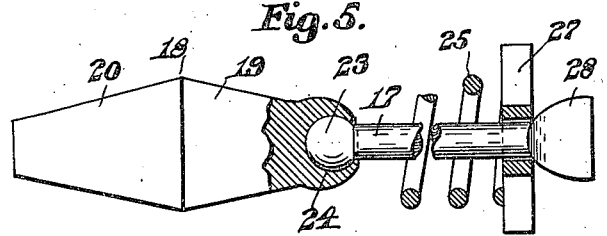
Inventor:
Ai B. Shaw,
by Walter E. Lombard,
Atty.

Patented July 3, 1923.

1,460,804

UNITED STATES PATENT OFFICE.

AI B. SHAW, OF MEDFORD, MASSACHUSETTS, ASSIGNOR TO SHAW SPECIALTY CO. INC., OF BOSTON, MASSACHUSETTS, A CORPORATION OF MASSACHUSETS.

VALVE STEM FOR PNEUMATIC TIRES.

Application filed July 18, 1922. Serial No. 575,801.

*To all whom it may concern:*

Be it known that I, AI B. SHAW, a citizen of the United States of America, and a resident of Medford, in the county of Middlesex and State of Massachusetts, have invented certain new and useful Improvements in Valve Stems for Pneumatic Tires, of which the following is a specification.

This invention relates to valve stems for the pneumatic tires used on the wheels of motor vehicles, and has for its object the production of a device of this character having a valve mechanism which will prevent leakage effectually, and which is so constructed that it may be adjusted readily into position to permit the inflation of the tire.

The invention consists of a valve stem having adjustably mounted on its upper end a tubular member having a valve seat with which a spring-pressed valve coacts, said valve having a cone-shaped end which is adapted to coact with a seat on the valve stem when the tubular member has been adjusted inwardly of said valve stem.

The invention further consists in providing a ball and socket joint between the valve and its stem.

The invention further consists of certain novel features of construction and arrangement of parts which will be understood readily by reference to the description of the drawings and to the claims to be hereinafter given.

For the purpose of illustrating the invention, one preferred form thereof is shown in the drawings, this form having been found to give satisfactory and reliable results, although it is to be understood that the various instrumentalities of which the invention consists can be variously arranged and organized, and that the invention is not limited to the precise arrangement and organization of the instrumentalities as herein shown and described, except as required by the scope of the appended claims.

Of the drawings:

Figure 1 represents a plan of a valve stem embodying the principles of the present invention.

Figure 2 represents an elevation of the same.

Figure 3 represents a similar view with the upper end in section and showing the parts adjusted into position for the use of the tire pump.

Figure 4 represents a view similar to Fig. 3 with the parts adjusted into the position to close the passage in the valve stem after the tire has been inflated, and Figure 5 represents an enlarged detail showing the ball and socket connection between the valve and its actuating rod.

Similar characters indicate like parts throughout the several figures of the drawings.

In the drawings, 10 is a casing adapted to be attached to the inner tube of a pneumatic tire in any well known manner.

The periphery of the casing 10 is preferably provided with a thread by which the usual dust cap or shield may be secured thereto.

In the outer end of the casing 10, there is formed a threaded chamber 11 in which is adjustably mounted the tubular member 12. This tubular member 12 has a passage 13 in its inner end in alinement with the passage 14 extending through the casing 10. The member 12 is provided also with a central chamber 15 of greater diameter than that of the passage 13, and in alinement with this chamber 15 is a cylindrical recess 16 in the outer end of the member 12, the diameter of said recess being greater than that of the chamber 15.

Extending through the tubular member 12 is a rod 17, having secured to its lower end a double-ended valve 18. This valve 18 has oppositely disposed conical ends 19 and 20, the end 19 being adapted to coact with the valve seat 21 on the inner end of the tubular member 12, while the cone-shaped end 20 is adapted to coact with the valve seat 22, surrounding the outer end of the passage 14.

In forming the passages through the casing 10 and the tubular member 12, these passages are sometimes liable to get out of alinement, and in order to accommodate the device to all sorts of conditions, it is desired to have a pivotal connection between the inner end of the rod 17 and the outer end of the double-ended valve 18.

In order to provide such a connection, the rod 17 has formed on its outer end, a ball 23 which is positioned in a spherical socket 24 formed in one end, 19, of the double-ended valve 18.

Within the chamber 15 is a helical spring 25, the inner end of which bears against a shoulder 26, while the opposite end bears against a spider 27 surrounding the rod 17 and movable therewith lengthwise of the recess 16.

When the valve and valve rod and the spider 27 have been positioned within the tubular member 12, the projecting end 28 of the rod 17 is upset in any well known manner to prevent the displacement of the spider 27 thereon.

When it is desired to inflate a tire, the tubular member 12 is moved into the position indicated in Fig. 3 of the drawings, this movement being accomplished by means of a spanner wrench acting upon the flat sides 29 formed by parallel grooves cut into the periphery of the tubular member 12.

When the parts are in the position indicated in Fig. 3 of the drawings, the spring 25 acting against the spider 27 will force the cone-shaped end 19 of the valve member 18 to its seat 21, thereby preventing any escape of air through the tubular member 12 during the operation of the usual pump to inflate the tire. Under the pressure of said pump, the valve 18 will be moved downwardly to permit the passage of the air through said tubular member 12 and the casing 10 into the inner tube.

Upon the stopping of the pump, the valve 18 will immediately be returned to its seat by means of the spring 25. When the tire has been sufficiently inflated, the tubular member 12 is turned by the spanner wrench until it assumes the position indicated in Fig. 4 of the drawings, at which time the cone-shaped end 20 is firmly forced to its seat 22 and the cone-shaped end 19 is also firmly in contact with the seat 21 on the tubular member 12.

Under these circumstances, it is absolutely impossible for any air to escape from the tire through the passage 14 and the tubular member 12. Owing to the ball and socket connection of the valve 18 with the rod 17, said valve is adapted to accommodate itself to the valve seat 22 even when it is not perpendicular to the axis of the member 12.

This makes a very convenient form of valve mechanism for inflating tires, which is simple in construction and most effective in operation.

It is believed that the operation and many advantages of the invention will be readily understood without further description.

Having thus described my invention, I claim:

1. A valve stem having a valve seat in its upper end; a tubular member adjustable lengthwise of said stem and having a valve seat in its inner end; a spring-pressed rod within said tubular member having a ball formed upon its inner end; and a valve having a socket to receive said ball.

2. A valve stem having a valve seat in its upper end; a tubular member adjustable lengthwise of said stem and having a valve seat in its inner end; a spring-pressed rod within said tubular member having a ball formed upon the inner end; and a double-ended valve having a socket to receive said ball.

3. A valve stem having a valve seat in its upper end; a tubular member adjustable lengthwise of said stem and having a valve seat in its inner end; a spring-pressed rod within said tubular member having a ball formed upon its inner end; and a valve having a socket to receive said ball and provided with cone-shaped ends adapted to coact with said valve seats.

4. A valve stem having a valve seat in its upper end; a tubular member threaded to said upper end and provided on its inner end with a valve seat; a rod within said tubular member; a valve on the lower end of said rod; a spider on the upper end of said rod; and a spring coacting with said spider to force said valve to its seat on said tubular member.

5. A valve stem having a valve seat in its upper end; a member mounted in the upper end of said stem provided with means for preventing the escape of air through said member during the pumping of the tire; and means for so adjusting said member relatively to said stem as to prevent escape of the air through said valve stem after the tire has been inflated.

Signed by me at 746 Old South Bldg., Boston, Mass., this 17th day of July, 1922.

AI B. SHAW.

Witnesses:
WALTER E. LOMBARD,
NATHAN C. LOMBARD.